(12) United States Patent
Tsukahara et al.

(10) Patent No.: US 9,383,780 B2
(45) Date of Patent: Jul. 5, 2016

(54) DISPLAY DEVICE AND OPERATION DEVICE

(71) Applicant: SONY CORPORATION, Tokyo (JP)

(72) Inventors: Tsubasa Tsukahara, Tokyo (JP); Rui Morisawa, Tokyo (JP); Takuya Niitsu, Kanagawa (JP); Daisuke Nagano, Kanagawa (JP); Daisuke Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 14/332,676

(22) Filed: Jul. 16, 2014

(65) Prior Publication Data

US 2015/0029649 A1 Jan. 29, 2015

(30) Foreign Application Priority Data

Jul. 24, 2013 (JP) ................................ 2013-153524

(51) Int. Cl.
*G06F 1/16* (2006.01)

(52) U.S. Cl.
CPC .............. *G06F 1/169* (2013.01); *G06F 1/1616* (2013.01); *G06F 1/1643* (2013.01); *G06F 1/1654* (2013.01); *G06F 1/1666* (2013.01); *G06F 1/1669* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,712,760 A * | 1/1998 | Coulon | ................. | G06F 1/1616 345/905 |
| 6,297,752 B1 * | 10/2001 | Ni | ......................... | G06F 1/1616 341/20 |
| 6,983,175 B2 * | 1/2006 | Kwon | .................... | G06F 1/1616 345/168 |
| 7,031,143 B2 * | 4/2006 | Madsen | ................ | G06F 1/1622 341/22 |
| 7,221,560 B2 * | 5/2007 | Varela | ................... | G06F 1/1622 341/22 |
| 7,269,450 B2 * | 9/2007 | Lee | ........................ | G06F 1/1622 379/433.11 |
| 7,986,514 B2 * | 7/2011 | Wang | .................... | G06F 1/1626 361/679.02 |
| 8,390,573 B2 * | 3/2013 | Trout | .................... | G06F 1/1626 345/169 |
| 8,564,540 B2 * | 10/2013 | Roka | ..................... | G06F 1/1626 345/168 |
| 2003/0201970 A1 * | 10/2003 | Liu | ........................ | G06F 1/1626 345/156 |
| 2004/0048632 A1 * | 3/2004 | Kuroda | .................. | H04M 1/23 455/550.1 |
| 2005/0054393 A1 * | 3/2005 | Fagerstrom | ........... | G06F 1/1622 455/575.1 |
| 2005/0105256 A1 * | 5/2005 | Chuang | .................. | G06F 1/1622 361/679.2 |
| 2006/0202963 A1 * | 9/2006 | Hermann | ............... | G06F 1/1622 345/168 |
| 2007/0037618 A1 * | 2/2007 | Lee | ...................... | H04M 1/0239 455/575.4 |
| 2007/0201931 A1 * | 8/2007 | Bowen | ................... | G06F 1/1616 400/486 |
| 2007/0268261 A1 * | 11/2007 | Lipson | ................... | G06F 1/1616 345/169 |

FOREIGN PATENT DOCUMENTS

| | | | | |
|---|---|---|---|---|
| DE | 4108169 A1 * | 9/1991 | ............ | G06F 1/1616 |
| JP | 2003-330611 A | 11/2003 | | |

* cited by examiner

*Primary Examiner* — Lisa Lea Edmonds
(74) *Attorney, Agent, or Firm* — Chip Law Group (57) ABSTRACT

There is provided a display device including a main body in which a display section is formed on a front surface side, and an operation body in which an operation section is formed and which is provided on a rear surface side of the main body. The main body and the operation body are partially spaced apart from each other, and the operation section is provided on an inner surface of the operation body, the inner surface facing a space formed between the main body and the operation body.

13 Claims, 8 Drawing Sheets

DISPLAY DEVICE AND OPERATION DEVICE

CROSS REFERENCE TO RELATED APPLICATIONS

This application claims the benefit of Japanese Priority Patent Application JP 2013-153524 filed Jul. 24, 2013, the entire contents of which are incorporated herein by reference.

BACKGROUND

The present disclosure relates to a display device and an operation device.

Recently, as a portable device, a relatively small-sized mobile phone or smartphone has become widespread. Regarding such a portable terminal, among various constraints for realizing portability, there have been developed technologies for providing users with excellent content consumption experiences by increasing a size of a screen, improving display performance, or improving operability.

For example, JP 2003-330611A discloses a technology that can perform a simple and reliable operation in a portable terminal by disposing a touch sensor on a rear surface side of a display.

SUMMARY

However, further improving a technology for providing users with excellent content consumption experiences has been sought after.

Therefore, the present disclosure proposes a new and improved display device and operation device that are capable of providing users with excellent content consumption experiences.

According to an embodiment of the present disclosure, there is provided a display device including a main body in which a display section is formed on a front surface side, and an operation body in which an operation section is formed and which is provided on a rear surface side of the main body. The main body and the operation body are partially spaced apart from each other, and the operation section is provided on an inner surface of the operation body, the inner surface facing a space formed between the main body and the operation body.

According to an embodiment of the present disclosure, there is provided an operation device including an operation section, and an attachment section mounted on a rear surface side of a display device in which a display section is formed on a front surface side. When mounted on the display device by the attachment section, the operation section is partially spaced apart from the display device, and the operation section is provided on an inner surface facing a space formed between the operation section and the display device.

According to one or more of embodiments of the present disclosure as described above, it is possible to provide users with excellent content consumption experiences.

DETAILED DESCRIPTION OF THE EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, the description will be given in the following order.

1. Technology Associated with Portable Terminal of Related Art
2. Embodiments
2-1. First Embodiment
2-1-1. External Configuration
2-1-2. Functional Configuration
2-2. Second Embodiment
2-3. Hardware Configuration
2-3-1. Configuration Example 1
2-3-2. Configuration Example 2
3 Summary

1. Technology Associated with Portable Terminal of Related Art

In the past, in a portable terminal, due to the constraints for realizing portability, it is difficult to secure a space for installing a keyboard such as a computer device. Therefore, a touch panel is mounted which can integrally realize a display function and an input function. It is common that the touch panel displays an operation system such as a button or a keyboard in a drawing region of a screen, so as to realize various operations by direct touch of a finger or a dedicated input pen on the screen. When a finger touches a part of the button displayed on the touch panel, the portable terminal accepts the input of a function assigned to the button. Therefore, even a touch panel having a relative small area can respond to a complex input.

However, the touch panel has various problems because a direct touch on a screen is necessary even when a finger or a dedicated input pen is used. For example, in the case of an operation of touching a screen with a finger, it is difficult to reduce a button to be displayed on a screen to have a smaller size than a width of the finger. Also, due to the necessity to touch with the finger, the user performs the operation while holding the terminal. Therefore, there is a problem that the number of fingers usable for the operation is small and the degree of freedom in the operation is lowered.

The technology disclosed in JP 2003-330611A reduces the necessity to display the operation system in the drawing region of the screen because the touch sensor is disposed on the rear surface side of the screen. However, the following problems still remain. First, due to the necessity to hold the portable terminal, a thumb remains on a screen surface side. Therefore, it may be difficult for a user to perform an operation without blocking the drawing region of the screen. Therefore, a user's content consumption experience has been hindered by his or her thumb. Second, due to the configuration in which the touch sensor is mounted on the rear surface side, a user has no choice but to perform an operation with other fingers having a low degree of freedom while positioning the thumb having a high degree of freedom on the screen surface. Since such an operating method is inappropriate to an operation of an application program, such as a game, in which an operation timing is important, a user's content consumption experience has been hindered by its poor operability.

Therefore, display devices according to embodiments of the present disclosure have been created in view of the above circumstances. Display devices according to embodiments of the present disclosure can provide users with excellent content consumption experiences. Hereinafter, display devices according to embodiments of the present disclosure will be described in detail.

2. Embodiments

2-1. First Embodiment

A display device according to the present embodiment includes a main body and an operation body and is configured such that a user performs an operation while holding the operation body provided on a rear surface side of the main body. An external configuration of the display device according to the present embodiment will be described with reference to FIGS. 1A, 1B, and 1C.

2-1-1. External Configuration

Figure 1A:
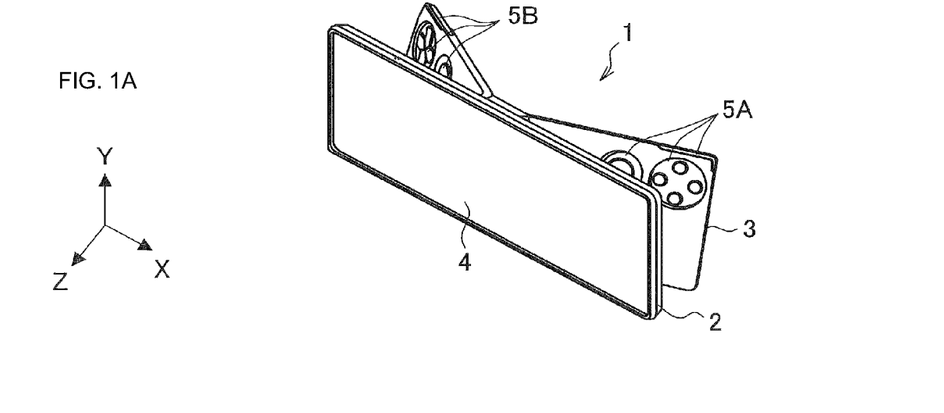
FIGS. 1A, 1B, and 1C are explanatory diagrams illustrating an external configuration of a display device according to a first embodiment.
Figure 1B:
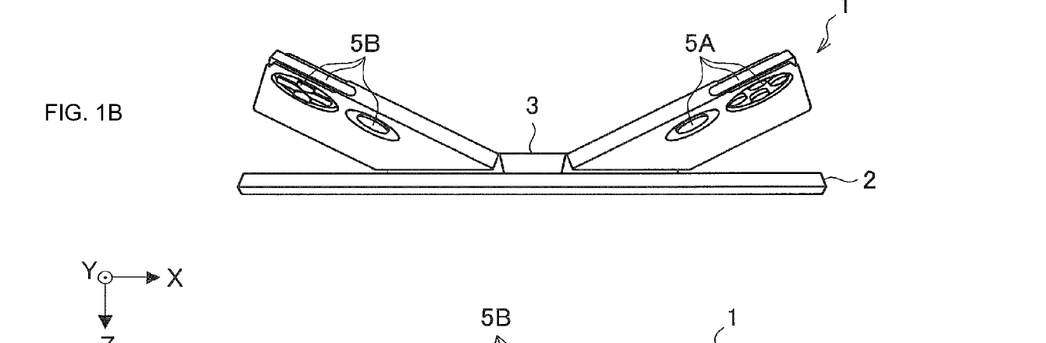
Figure 1C:
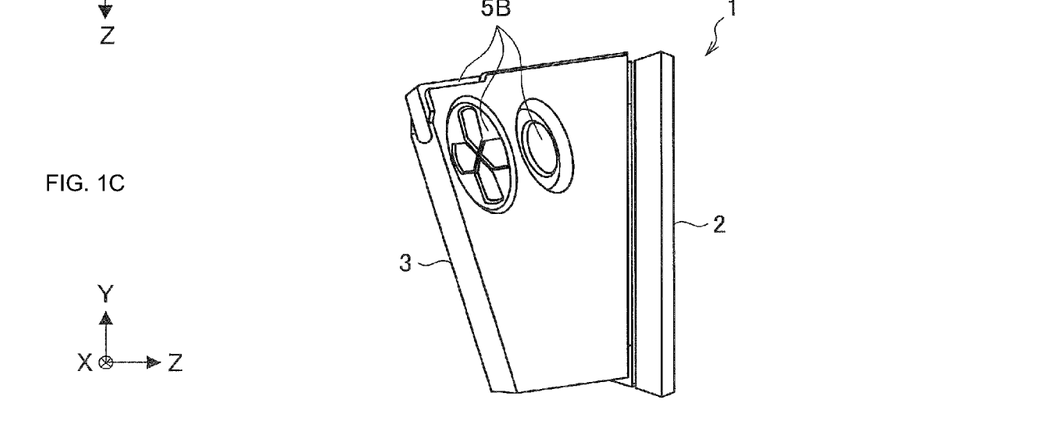

FIGS. 1A, 1B, and 1C are explanatory diagrams illustrating the external configuration of the display device according to the first embodiment. More specifically, FIG. 1A is a perspective view of the display device 1, FIG. 1B is a plan view of the display device 1, when seen from a Y axis direction, and FIG. 1C is a side view of the display device 1, when seen from a –X axis direction.

As illustrated in FIGS. 1A, 1B, and 1C, the display device 1 includes a main body 2 (display device) and an operation body 3 (operation device). In the main body 2, a display section 4 is formed on a Z axis direction side. In the following, a Z axis direction side is also referred to as a front surface side, and a –Z axis direction side is also referred to as a rear surface side. The operation body 3 is provided on the rear surface side of the main body 2. An operation section 5A which a user operates with his or her right hand, and an operation section 5B which a user operates with his or her left hand are formed in the operation body 3. In the following, when it is not particularly necessary to distinguish the operation section 5A and the operation section 5B, they are collectively referred to as the operation section 5. Incidentally, the operation section 5 may be formed for the purpose of only one of the left hand and the right hand.

Also, as illustrated in FIGS. 1A, 1B, and 1C, since the main body 2 and the operation body 3 are partially spaced apart from each other, a space is formed between the main body 2 and the operation body 3. The operation section 5 is formed on an inner surface of the operation body 3. the inner surface facing the space formed between the main body 2 and the operation body 3. That is, the operation section 5 is the front surface side of the operation body 3 and is formed in the space sandwiched between the main body 2 and the operation body 3.

Also, as illustrated in FIGS. 1A, 1B, and 1C, the main body 2 and the operation body 3 are spaced apart at two places of both ends of the X axis direction (long side direction) of the main body 2. The user operates the operation section 5 while holding the operation body 3 by inserting the thumbs of the right hand and the left hand, respectively, into two spaces sandwiched between the main body 2 and the operation body 3. Hereinafter, a situation in which the user operates the display device 1 will be described with reference to FIG. 2.

Figure 2:
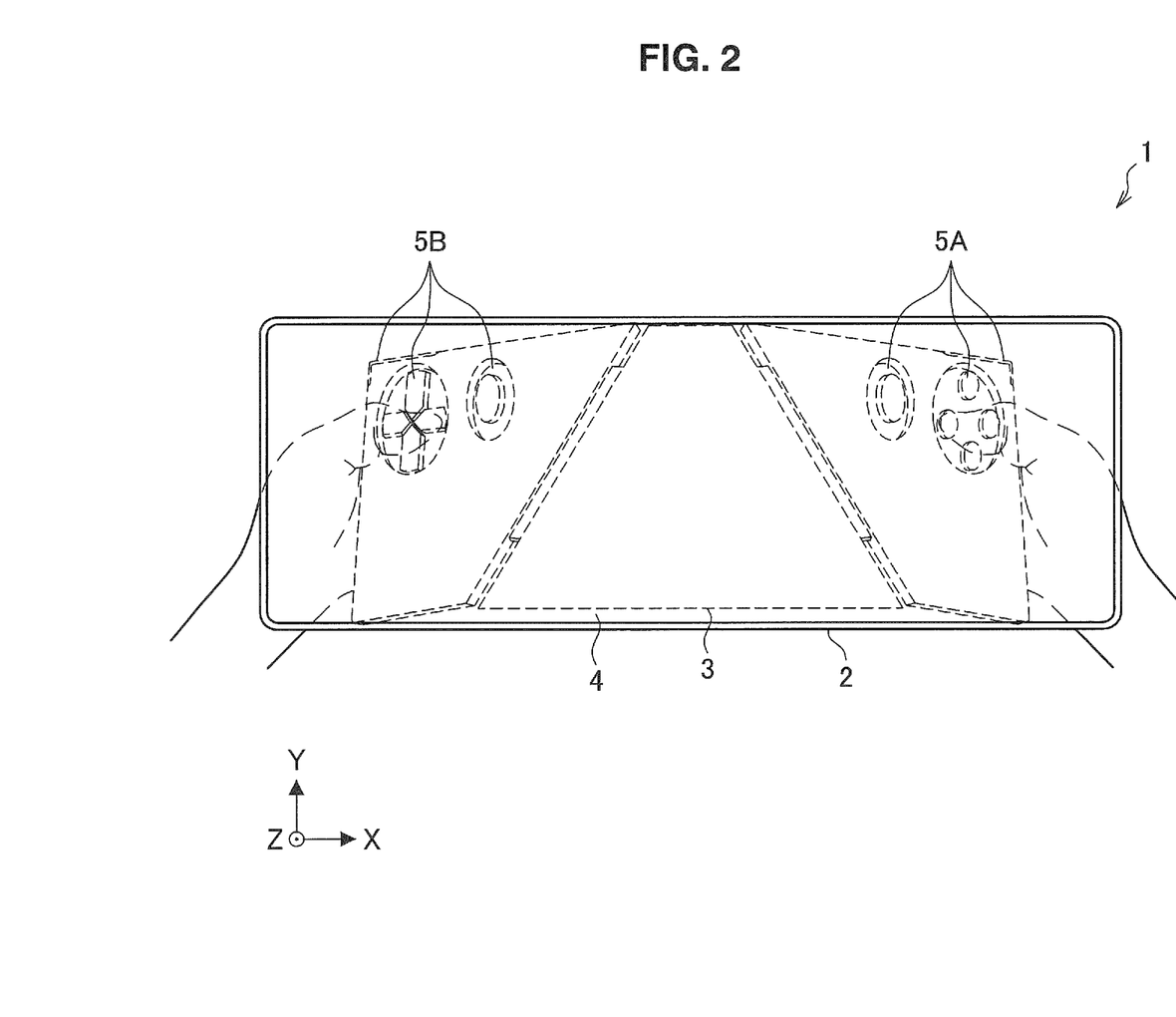
FIG. 2 is an explanatory diagram illustrating an example of a situation in which a user operates the display device according to the first embodiment.

FIG. 2 is an explanatory diagram illustrating an example of the situation in which the user operates the display device according to the first embodiment. More specifically, FIG. 2 is a front view, when seen from the Z axis direction, illustrating the situation in which the user operates the display device 1. As illustrated in FIG. 2, when operating the display device 1, the user operates the operation section 5 with his or her thumb while holding the operation body 3 with the base of the thumb and the remaining fingers. Also, the user may operate the operation section 5, which is formed in an end portion of the operation body 3 in the Y axis direction, with his or her index finger or the like.

In any case, in order for the user to perform the operation while holding the operation body 3 formed separately from the main body 2, as illustrated in FIG. 2, the user's finger does not remain on the display section 4. Since the user can perform the operation without covering a drawing region of the display section 4 with his or her finger, the user can be immersed in a content displayed on the display section 4. Also, since the user can perform the operation without touching the display section 4 with his or her finger, the user can perform the operation without contaminating the surface of the display section 4 with his or her finger. Furthermore, since the display device 1 does not have to display operation systems, except for the content, on the display section 4, the entire display region can be used as the drawing region.

Also, in the display device 1 according to the present embodiment, as illustrated in FIG. 2, the user can operate the operation section 5 with his or her thumb having a high degree of freedom. Since such an operation method improves an operation of an application program, such as a game, in which an operation timing is important, a user's content consumption experience is not hindered by its operability.

Furthermore, as illustrated in FIG. 2, since the user's finger operating the operation section 5 is arranged between the main body 2 and the operation body 3, the user's own finger moving for the operation does not come into the user's field of vision. Therefore, since the attention is not distracted due to the movement of the finger coming into the field of vision, the user can be immersed in the content displayed on the display section 4.

Also, as illustrated in FIG. 2, the main body 2 and the operation body 3 are formed such that the operation body 3 is included in the main body 2 when the display device 1 is projected on a projection surface parallel to the display surface of the display section 4. That is, when the display device 1 is seen from the Z axis direction, the main body 2 and the operation body 3 may be formed such that the operation body 3 is not seen by being hidden in the main body 2. In such a configuration, the user's attention is not distracted due to the operation body 3 coming into the field of vision, a sense of immersion in the content displayed on the display section 4 is further improved.

Herein, as illustrated in FIG. 2, the display section 4 is horizontally formed in the X axis direction. In the present embodiment, due to studies on an aspect ratio and the result of investigation conducted by the applicant, an aspect ratio of the display section 4 is set to 21:9, or is set such that a ratio of a long side is greater than 21:9.

For example, as the studies on the aspect ratio, whether the user's widening the viewing angle of the image in a horizontal direction is effective so as to increase the presence and powerfulness is described in "The Journal of The Institute of Image Information and Television Engineers, vol. 60, No. 8, pp. 1288-1295 (2006), The Viewing Angle Dependency in the Presence of Wide Field Still Image Viewing and its Relationship to the Evaluation Indices, Masaki Emoto, Kenichiro Masaoka, Masayuki Sugawara, and Yuji Nojiri". Also, whether a sense of panorama or powerfulness are increased as a long-to-short ratio of a photo is increased, that is, as it comes close to a horizon, is described in "Influence of aspect ratio and size of photographs on their rated impressions, the Ritsumeikan Human Science, vol. 5, pp. 171-185, 2003. 3, Yukiko Ohnaka, Tomomi Takezawa and Takao Matsuda".

Also, the applicant has investigated the aspect ratio of the display section 4 at which the excellent content consumption experience can be provided to the users. Specifically, the applicant has conducted questionnaire survey to evaluate the most enjoyable viewing angle when 20 persons experienced contents such as a movie or a game, a photo at various aspect ratios. The aspect ratios used in the investigation were 4:3, 16:9, 21:9, 27:9, 32:9, and 36:9, and many subjects evaluated that they enjoyed the best content at the laterally long aspect ratios of 21:9 or more.

Therefore, by forming the display section 4 at the laterally long aspect ratio of 21:9 or more, the display device 1 can fill the user's peripheral vision with the content and can realize the content consumption experience having the presence, the sense of panorama, and powerfulness.

As described above, the display device 1 according to the present embodiment can realize the superior operability and the sense of immersion in the content by the positional relationship of the main body 2 illustrated in FIG. 2, the operation body 3, and the user's hand performing the operation therebetween. Furthermore, by forming the display section 4 at the laterally long aspect ratio of 21:9 or more, the display device 1 can fill the user's peripheral vision with the content and can realize the content consumption experience having the presence, the sense of panorama, and powerfulness. The display device 1 can provide users with excellent content consumption experiences by the effect from the positional relationships and the aspect ratio.

Also, in the display device 1 according to the present embodiment, as illustrated in FIGS. 3A, 3B, 4A, 4B, 4C, 4D, and 4E, the operation body 3 can be foldable, and the main body 2 and the operation body 3 can be detachable/replaceable.

Figure 3A:
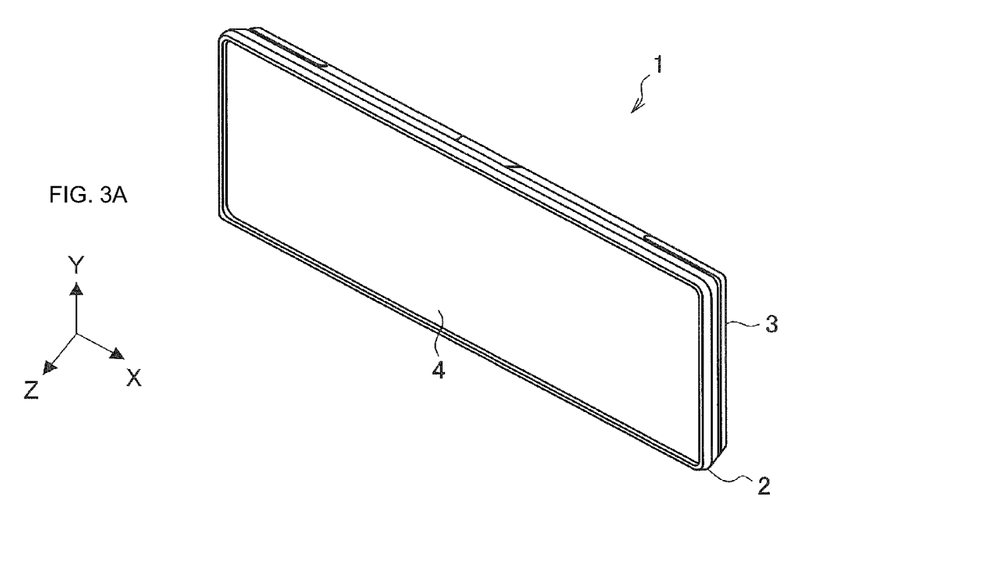
FIGS. 3A and 3B are explanatory diagrams illustrating an external configuration of the display device according to the first embodiment.
Figure 3B:
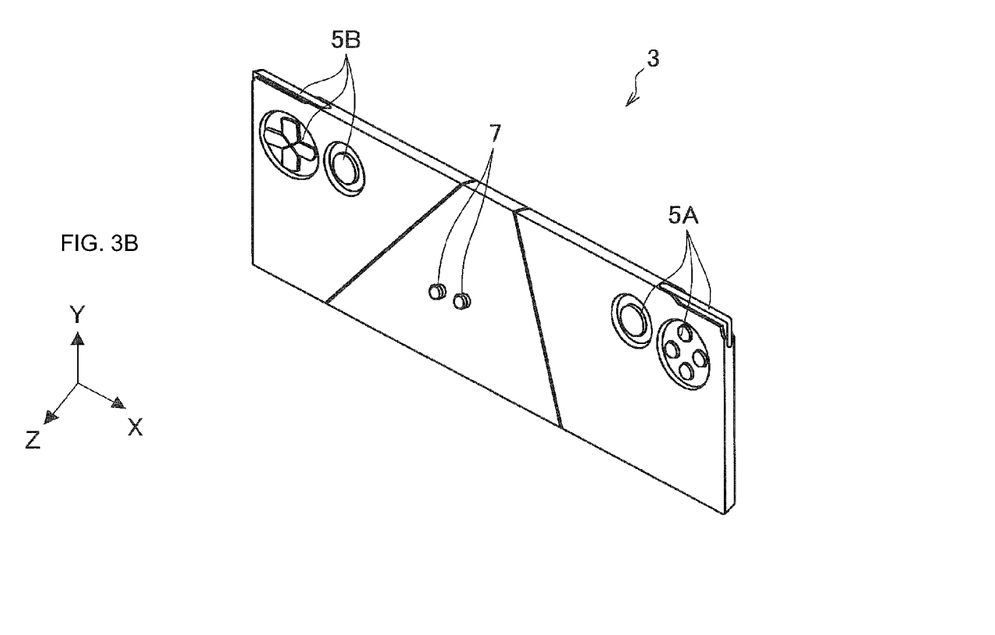

FIGS. 3A and 3B are explanatory diagrams illustrating the external configuration of the display device 1 according to the first embodiment. More specifically, FIG. 3A is a perspective view of the display device 1 in a state in which the operation body 3 is folded and accommodated. FIG. 3B is a perspective view of the operation body 3 that is removed from the main body 2 and is accommodated.

Also, as illustrated in FIG. 3B, an attachment section 7 detachably attaching the main body 2 and the operation body 3 is provided in the operation body 3. Therefore, the user can differently use the operation body 3 according to the content. For example, when the display section 4 of the main body 2 is a touch panel having a touch sensor, the user can perform a simple content operation, such as a tap of a screen, in a state in which the operation body 3 is removed. On the other hand, in the case of a content operation for which a complicated operation such as a game is necessary, the user can perform the operation by attaching the operation body 3. Also, the user can replace the operation body 3 with other operation body having different button arrangement or shape, opening/closing mechanism, and the like according to the content.

Also, as illustrated in FIG. 3A, the operation body 3 can be a state in which a portion where the operation section 5 is provided is folded and accommodated. In the accommodated state, the main body 2 and the operation body 3 are integrated, thereby improving the portability of the display device 1. Also, regarding the accommodated state illustrated in FIG. 3A, the state of the operation body 3 illustrated in FIGS. 1A, 1B, and 1C is referred to as an open state. The operation body 3 can switch the accommodated state and the open state by the opening/closing mechanism described to be below with reference to FIGS. 4A, 4B, 4C, 4D, and 4E.

Figure 4A:
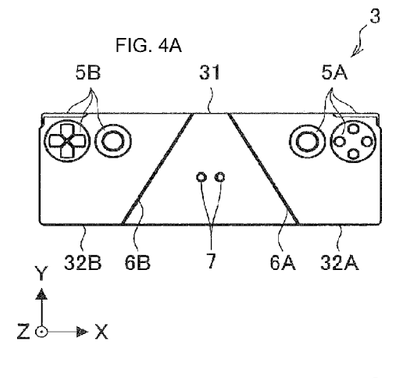
FIGS. 4A, 4B, 4C, 4D, and 4E are explanatory diagrams illustrating an opening/closing mechanism of an operation body according to the first embodiment.
Figure 4B:
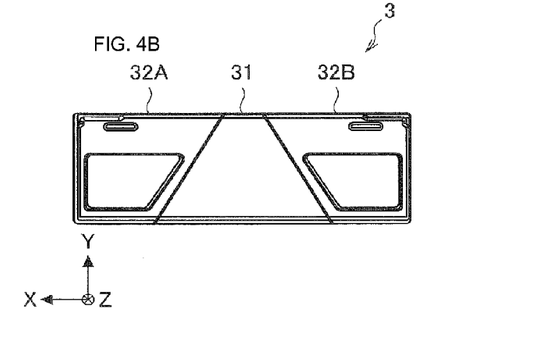
Figure 4C:
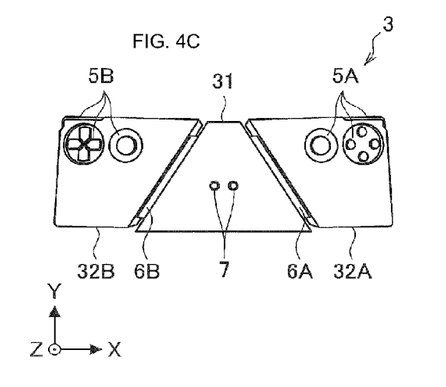
Figure 4D:
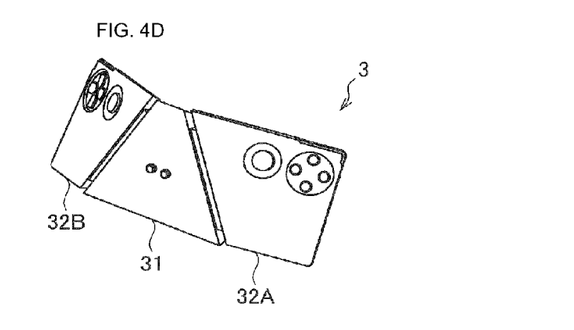
Figure 4E:
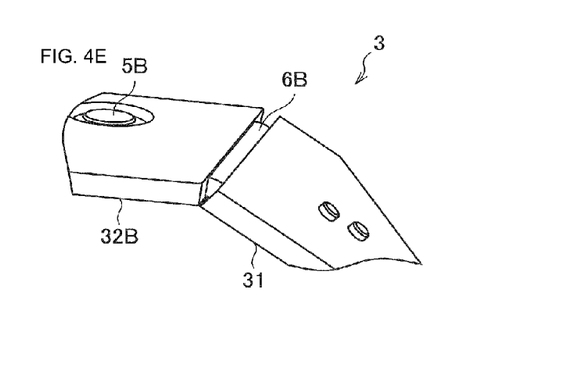

FIGS. 4A, 4B, 4C, 4D, and 4E are explanatory diagrams illustrating the opening/closing mechanism of the operation body 3 according to the first embodiment. More specifically, FIG. 4A is a front view illustrating the operation body 3 of the accommodated state, when seen from the Z axis direction. FIG. 4B is a rear view illustrating the operation body 3 of the accommodated state, when seen from the −Z axis direction. FIG. 4C is a front view illustrating the operation body 3 of the open state, when seen from the Z axis direction. FIG. 4D is a front view illustrating the operation body 3 of the open state. FIG. 4E is an enlarged perspective view illustrating a movable section 6B of the operation body 3 of the open state.

In the operation body 3, movable sections 6A and 6B are provided to move a part of the operation body 3 in a direction substantially perpendicular to the display surface of the display section 4 (Z axis direction or −Z axis direction). In the following, when it is not particularly necessary to distinguish the movable section 6A and the movable section 6B, they are collectively referred to as the movable section 6. As illustrated in FIGS. 4A, 4B, 4C, 4D, and 4E, the operation body 3 is divided into three parts by the movable section 6. A portion where the attachment section 7 is provided is referred to as an attachment portion 31, a portion where the operation section 5A is provided is referred to as an operation portion 32A, and a portion where the operation section 5B is provided is referred to as an operation portion 32B. Also, when it is not particularly necessary to distinguish the operation portion 32A and the operation portion 32B, they are collectively referred to as the operation portion 32. A position of the operation portion 32 in the open state is referred to as an open position, and a position of the operation portion 32 in the accommodated state is referred to as an accommodation position.

As illustrated in FIGS. 4C to 4E, the movable section 6 sets the operation body 3 to the open state by moving the operation portion 32, which is a part of the operation body 3, in a direction being spaced apart from the main body 2 (−Z axis direction) to move the operation portion 32 to the open position. At this time, the movable section 6 sets the operation body 3 to the open state by bending the operation portion 32 such that the end portion side of the X axis direction and the end portion side of the −X axis direction (end portion side of the long side direction) is opened. Since the operation portion 32 is opened to the outside in the open state, as illustrated in FIG. 2, the user can perform the operation while inserting a hand from both the X axis direction and the −X axis direction and holding the operation body 3. Also, as illustrated in FIGS. 3B, 4A and 4B, the movable section 6 sets the operation body 3 to the accommodated state by moving the operation portion 32, which is a part of the operation body 3, in a direction coming close to the main body 2 (Z axis direction) to move the operation portion 32 to the accommodation position.

Also, as illustrated in FIG. 4A, the shape of the operation portion 32 is gradually widened along the Y axis direction (short side direction of the main body 2), and the operation section 5 is formed on the widened side (Y axis direction side). In the present embodiment, as illustrated in FIG. 4A, the shape of the operation portion 32 is a trapezoid that is gradually widened along the Y axis direction, and the operation section 5 is formed near a bottom of the widened side of the trapezoidal shape. Due to such a shape, a spare for providing the operation section 5 is widely secured, and a space allowing the thumb to be movable in the open state is widely ensured, thereby improving the operability. The shape of the operation portion 32 may be a trapezoidal shape as illustrated in FIG. 4A, or may be other shapes such as a triangle.

So far, the external configuration of the display device 1 has been described. Subsequently, a functional configuration of the display device 1 will be described.

2-1-2. Functional Configuration (Main Body 2)

The main body 2 is a housing in which the display section 4 is formed on the front surface side. The main body 2 may take any shape. In the present specification, as illustrated in FIGS. 1A, 1B, and 1C, the main body 2 has a substantially rectangular parallelepiped shape, but may have any other shape and may have an uneven or distorted shape. Also, the main body 2 has a function as a controller for controlling the entire display device 1. The internal configuration of the main body 2 will be described with reference to FIGS. 7 and 8.

(Display Section 4)

The display section 4 displays image data (still image data/moving image data) which the main body 2 stores inside or which is input from the outside through a network or a storage medium. As illustrated in FIGS. 1A, 1B, and 1C, the display section 4 is formed on a substantially entire surface of the display surface side of the main body 2. The display section 4 is implemented by, for example, a Liquid Crystal Display (LCD) or an Organic Light-Emitting Diode (OLED), and the like. Also, the display section 4 may be implemented as a touch panel having a touch sensor.

(Operation Body 3)

The operation body 3 is a housing having the operation section 5 on the front surface side. As described with reference to FIGS. 3A, 3B, 4A, 4B, 4C, 4D, and 4E, the operation body 3 is set to the accommodated state or the open state by the movable section 6. In the present specification, as illustrated in FIG. 4A, the operation body 3 of the accommodated state has a substantially rectangular parallelepiped shape, but may have any other shape and may have an uneven or distorted shape. The operation section 5, the movable section 6, and the attachment section 7 are provided in the operation body 3.

(Operation Section 5)

The operation section 5 has a function of accepting the input from the user. For example, the operation section 5 is implemented by a button or a keyboard, a touch sensor, a pen input, a track ball, a stick controller capable of a tilting operation, a dial, or the like.

(Movable Section 6)

As described with reference to FIGS. 4A, 4B, 4C, 4D, and 4E, the movable section 6 has a function of setting the operation body 3 to the open state or the accommodated state by opening or closing the operation portion 32. The movable section 6 is implemented by, for example, an openable/closable mechanism such as a hinge mechanism or a link mechanism.

(Attachment Section 7)

The attachment section 7 has a function of detachably attaching the main body 2 and the operation body 3. The attachment section 7 is formed by, for example, a convex plug, and is fitted to a portion corresponding to the rear surface side of the main body 2 to connect the main body 2 and the operation body 3. The attachment section 7 may transmit the user input, which is input to the operation section 5, to the main body 2 via a wired communication by physically electrically connecting the main body 2 and the operation body 3 together. The operation body 3 may include a communication section (not illustrated) to transmit the user input, which is input to the operation section 5, to the main body 2 via a wireless communication. Moreover, the attachment section 7 may be made of a magnet to connect the main body 2 and the operation body 3 by a magnetic force. Also, the entire attachment portion 31 may be made of a magnet.

So far, the display device 1 according to the first embodiment has been described. Subsequently, a second embodiment will be described.

2-2. Second Embodiment

In the present embodiment, an operation body 30 having an opening/closing mechanism different from the operation body 3 according to the first embodiment is mounted on the main body 2. Hereinafter, the second embodiment will be described with reference to FIGS. 5A, 5B, 5C, 6A, 6B, 6C, 6D, and 6E. Hereinafter, parts overlapped with the description of the first embodiment will be omitted.

Figure 5A:
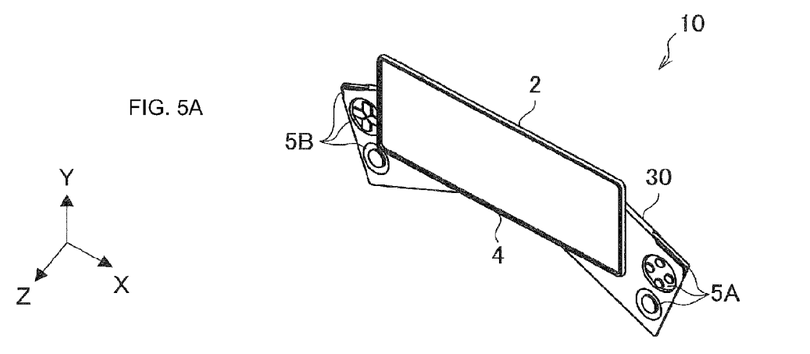
FIGS. 5A, 5B, and 5C are explanatory diagrams illustrating an external configuration of a display device according to a second embodiment.
Figure 5B:
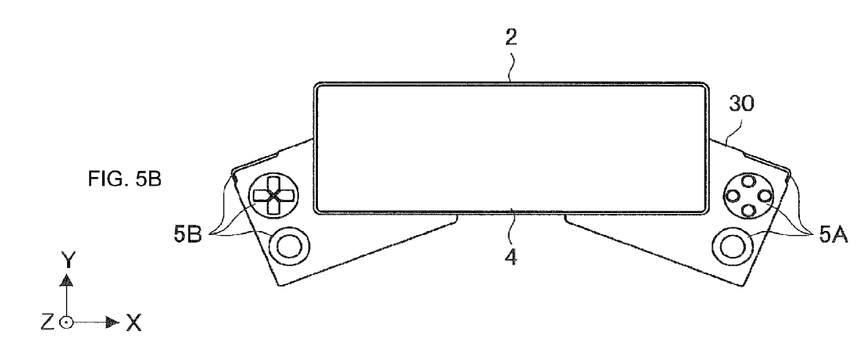
Figure 5C:
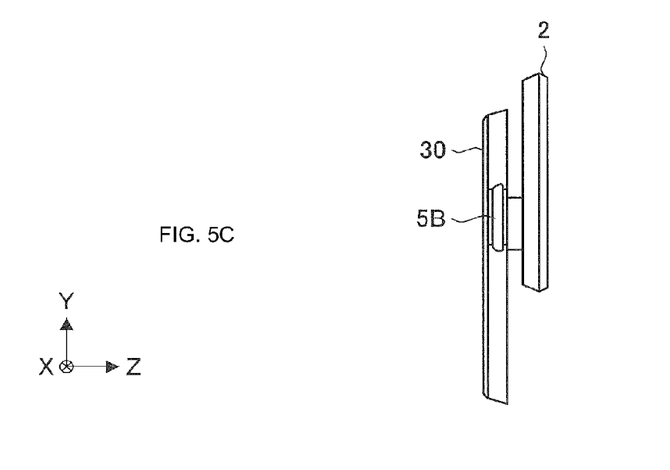

FIGS. 5A, 5B, and 5C are explanatory diagrams illustrating the external configuration of the display device 10 according to the second embodiment. More specifically, FIG. 5A is a perspective view of the display device 10, FIG. 5B is a front view of the display device 10, when seen from a Z axis direction, and FIG. 5C is a side view of the display device 10, when seen from a −X axis direction.

Figures 6A, 6B, 6C, 6D, 6E:
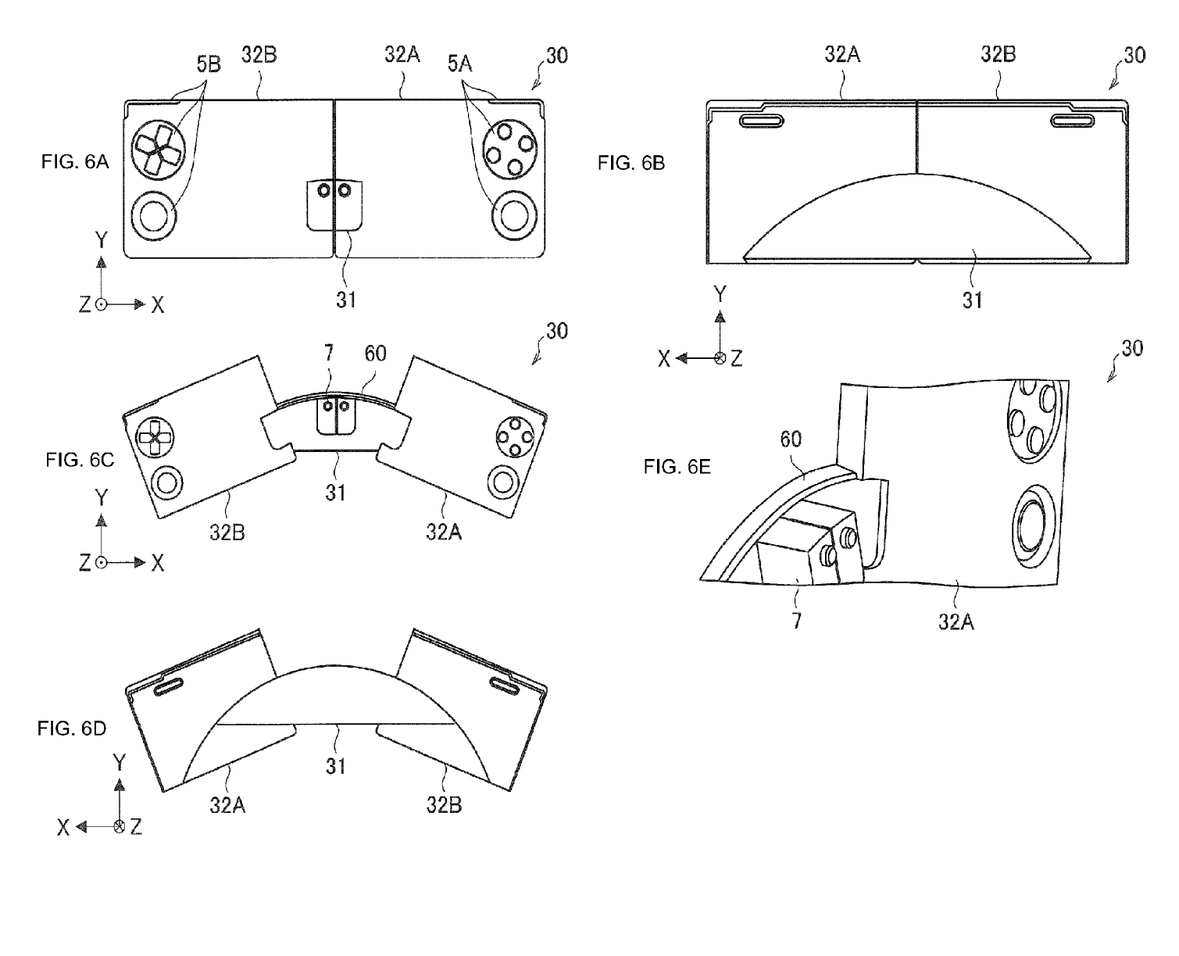
FIGS. 6A, 6B, 6C, 6D, and 6E are explanatory diagrams illustrating an opening/closing mechanism of an operation body according to the second embodiment.

FIGS. 6A, 6B, 6C, 6D, and 6E explanatory diagrams illustrating the opening/closing mechanism of the operation body 30 according to the second embodiment. More specifically, FIG. 6A is a front view illustrating the operation body 30 of the accommodated state, when seen from the Z axis direction. FIG. 6B is a rear view illustrating the operation body 30 of the accommodated state, when seen from the −Z axis direction. FIG. 6C is a front view illustrating the operation body 30 of the open state, when seen from the Z axis direction. FIG. 6D is a rear view illustrating the operation body 30 of the open state, when seen from the −Z axis direction. FIG. 6E is an enlarged perspective view illustrating a movable section 60 of the operation body 30 of the open state and an attachment section 7.

As illustrated in FIG. 6E, the attachment section 7 is formed to be thicker in the Z axis direction than the operation portion 32. Therefore, as illustrated in FIG. 5C, the main body 2 and the operation portion 32 are spaced apart from each other by a thickness difference between the attachment section 7 and the operation portion 32. Therefore, the user can operate the operation section 5 while holding the operation body 30 by inserting the thumb into the space sandwiched between the main body 2 and the operation body 30.

Also, in the operation body 30, a movable section 60 is provided to move the operation portions 32A and 32B being a part of the operation body 30 in a direction substantially parallel to the display surface of the display section 4 (X axis direction or −X axis direction). The movable section 60 is implemented by, for example, a slide mechanism.

As illustrated in FIGS. 6C to 6E, the movable section 60 sets the operation body 30 to the open state by moving the operation portion 32 in a direction being spaced apart from the attachment portion 31, that is, by moving the operation portion 32A in the X axis direction and the operation portion 32B in the −X axis direction, to thereby move the operation portion 32 to the open position. In the open state, since the operation portion 32 is visible without being hidden to the rear surface side of the main body 2, the user can perform the operation while viewing the operation section 5, thereby further improving the operability. Also, as illustrated in FIGS. 6A and 6B, the movable section 60 sets the operation body 30 to the accommodated state by moving the operation portion 32 in a direction coming close to the attachment portion 31, that is, by moving the operation portion 32A in the −X axis direction and the operation portion 32B in the X axis direction, to thereby move the operation portion 32 to the accommodation position.

Also, similar to the operation body 3 according to the first embodiment, the operation body 30 according to the present embodiment is mounted detachably from the main body 2 by the attachment section 7.

So far, the display device 10 according to the second embodiment has been described.

2-3. Hardware Configuration

Figure 7:
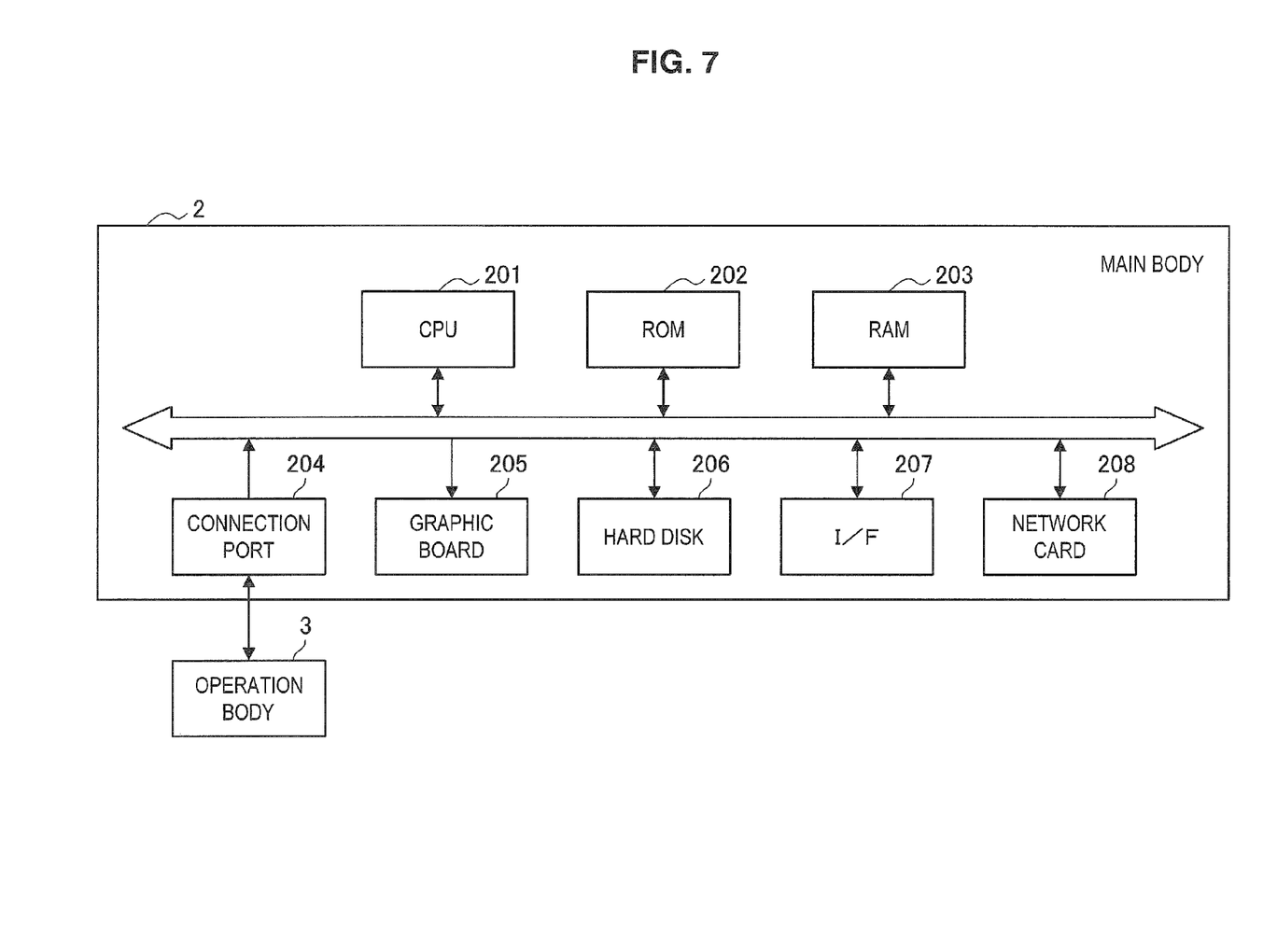
FIG. 7 is a diagram illustrating a hardware configuration example of a display device according to an embodiment of the present disclosure.
Figure 8:
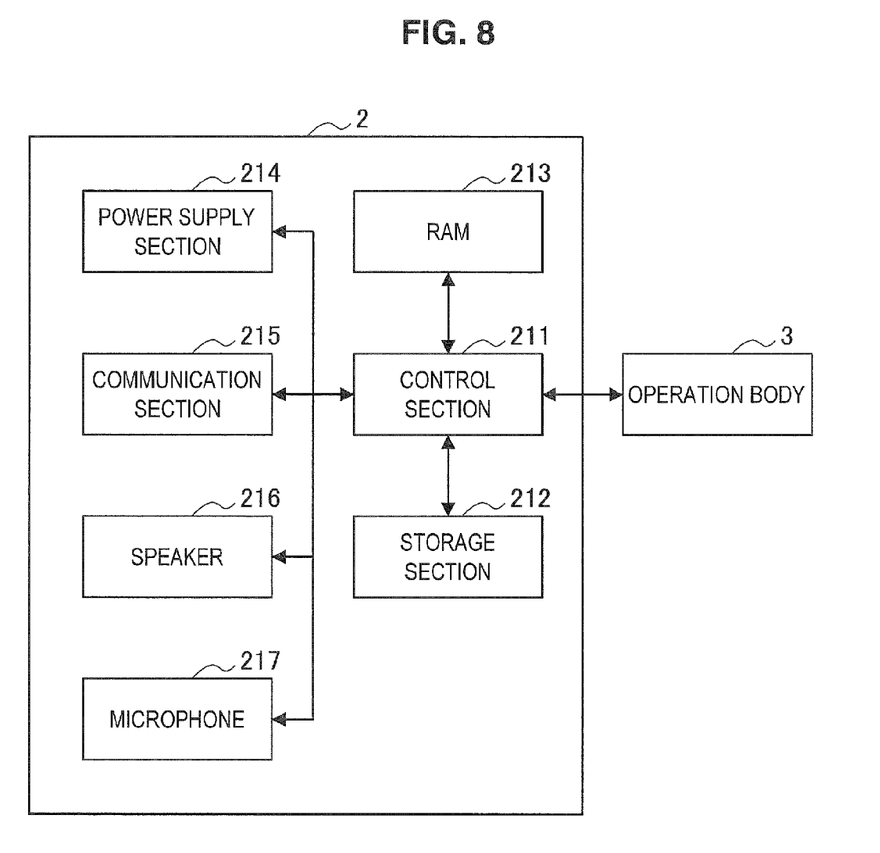
FIG. 8 is a diagram illustrating a hardware configuration example of a display device according to an embodiment of the present disclosure.

Subsequently, a hardware configuration example of the display device according to an embodiment of the present disclosure will be described. FIGS. 7 and 8 are diagrams illustrating hardware configuration examples of the display device according to an embodiment of the present disclosure. FIG. 7 illustrates a configuration example of a case where the main body 2 is configured similar to a general note type, a terminal type, or a tablet type personal computer (PC). FIG. 8 illustrates a configuration example of a case where the main body 2 is configured similar to a mobile phone terminal device. However, the hardware configuration examples illustrated in FIGS. 7 and 8 are merely an example of the hardware configuration of the display device 1. Therefore, the hardware configuration of the display device 1 is not limited to the example illustrated in FIG. 7. For example, the operation body 3 may have a part of the hardware and function which the main body 2 has.

2-3-1. Configuration Example 1

As illustrated in FIG. 7, the main body 2 include a Central Processing Unit (CPU) 201, a Read Only Memory (ROM) 202, a Random Access Memory (RAM) 203, a connection port 204, a graphic board 205, a hard disk 206, an interface (UF) 207, and a network card 208.

The CPU 201 functions as an arithmetic processing unit and a controller, and controls overall operations inside the main body 2 according to various programs. Also, the CPU 201 may be a microprocessor. The ROM 202 stores programs or arithmetic data and the like which are used by the CPU 201. The RAM 203 temporarily stores programs which are used by the CPU 201, or parameters which are appropriately changed upon execution thereof. These are mutually connected through a host bus configured by a CPU bus or the like. The CPU 201 performs a variety of processes, based on user operation information output from the operation body 3 through the connection port 204.

The connection port 204 is a connector that is physically and electrically connected to the operation body 3. The connection port 204 transmits, to the CPU 201, operation information indicating the user input which is output from the operation body 3 and is input to the operation section 5. Also, FIG. 7 illustrates an example in which the connection port 204 is connected to the operation body 3 according to the first embodiment, but the connection port 204 may be connected to the operation body 30 according to the second embodiment or any other operation body.

The graphic board 205 controls the display of the display section 4 by outputting image data (still image data/moving image data) to the display section 4. Moreover, the main body 2 may output audio data from a speaker or a headphone by using a sound card (not illustrated).

The hard disk 206 is a data storage device formed as an example of the storage section of the main body 2 according to the present embodiment. The hard disk 206 may include a storage medium, a storage device storing data in the storage medium, a reading device reading data from the storage medium, and an erasing device erasing data stored on the storage medium. The hard disk 206 stores various application programs or various data, such as an operating system (OS) executed by the CPU 201, a device driver for operating the operation body 3 on a computer, a word processor, a spread sheet, and the like.

The I/F 207 is a connection device for connecting the main body 2 to a peripheral device. The I/F 207 is implemented by, for example, a Universal Serial Bus (USB) connector or the like, and is connected to a scanner, a printer, or the like.

The network card 208 is a communication interface for perform data transmission and reception between external devices. The network card 208 performs direct communication with external devices or performs wireless communication through a network access point, for example, by Wireless Local Area Network (LAN), Wireless Fidelity (Wi-Fi, registered trademark), infrared communication, Bluetooth (registered trademark), Long Term Evolution (LTE), or the like. Moreover, the network card 208 may perform wired communication. Incidentally, the main body 2 may include a modem instead of the network card 208.

So far, the example of the case where the main body 2 is configured similar to a general note type, a terminal type, or a tablet type personal computer (PC) has been described. Subsequently, a configuration example of a case where the main body 2 is configured similar to a mobile phone terminal device will be described below.

2-3-2. Configuration Example 2

As illustrated in FIG. 8, the main body 2 includes a control section 211, a storage section 212, a RAM 213, a power supply section 214, a communication section 215, a speaker 216, and a microphone 217.

The control section 211 functions as an arithmetic processing unit and a controller, and controls overall operations inside the main body 2 according to various programs. Also, the control section 211 may be a microprocessor. The storage section 212 stores programs or arithmetic data and the like which are used by the control section 211. More specifically, the storage section 212 stores various application programs or various data, such as an operating system executed by the control section 211, a device driver for operating the operation body 3 on a computer, a word processor, a spread sheet, and the like. The RAM 213 temporarily stores programs which are used by the control section 211, or parameters which are appropriately changed upon execution thereof. Also, the control section 211 performs a variety of processes, based on user operation information output from the operation body 3. Also, FIG. 8 illustrates an example in which the control section 211 is connected to the operation body 3 according to the first embodiment, but the control section 211 may be connected to the operation body 30 according to the second embodiment or any other operation body.

The power supply section 214 has a function of supplying power to the respective sections of the main body 2. The power supply section 214 is implemented by, for example, a battery.

The communication section 215 is a communication module for perform data transmission and reception between external devices. The communication section 215 performs direct communication with external devices or performs wireless communication through a network access point, for example, by Code Division Multiple Access (CDMA), LTE, Wireless LAN, Wi-Fi (registered trademark), infrared communication, Bluetooth (registered trademark), or the like. Moreover, the communication section 215 may perform wired communication. Incidentally, the main body 2 may include a modem instead of the communication section 215.

The speaker 216 converts audio data into analog signals through a Digital Analog Converter (DAC) and an amplifier, and outputs (reproduces) the analog signals. The microphone 217 collects ambient sound, performs conversion into digital signals through an amplifier and an Analog Digital Converter (ADC), and outputs sound data.

So far, the hardware configuration example of the display device according to the present embodiment has been described.

3. Summary

As described above, the display devices according to the respective embodiments of the present disclosure can provide users with excellent content consumption experiences by the synergy effect of the effect from the positional relationship and the effect from the aspect ratio. More specifically, the display devices according to the respective present embodiment can realize the superior operability and the sense of immersion in the content by the positional relationship of the main body, the operation body, and the user's hand performing the operation therebetween. Also, due to the display section having the laterally long aspect ratio of 21:9 or more, the display devices according to the respective embodiments of the present disclosure can fill the user's peripheral vision with the content and can realize the content consumption experience having the presence, the sense of panorama, and powerfulness.

The preferred embodiments of the present disclosure have been described in detail with reference to the appended drawings, but the technical scope of the present disclosure is not limited to such examples. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.
(1) A display device including:
  a main body in which a display section is formed on a front surface side; and
  an operation body in which an operation section is formed and which is provided on a rear surface side of the main body,
  wherein the main body and the operation body are partially spaced apart from each other, and the operation section is provided on an inner surface of the operation body, the inner surface facing a space formed between the main body and the operation body.
(2) The display device according to (1),
  wherein a movable section is provided in the operation body, the movable section configured to move a part of the operation body in a direction substantially perpendicular to a display surface of the display section, and
  wherein the movable section moves a part of the operation body to an open position by moving the part of the operation body in a direction being spaced apart from the display section, and moves the part of the operation body to an accommodation position by moving the part of the operation body in a direction coming close to the display section.
(3) The display device according to (1) or (2),
  wherein an attachment section is provided in the operation body, and the attachment section detachably attaches the operation body and the main body.
(4) The display device according to any one of (1) to (3),
  wherein, when the display device is projected on a projection surface parallel to the display surface of the display section, the operation body is included in the main body.
(5) The display device according to any one of (1) to (4),
  wherein an aspect ratio of the display section is set to 21:9, or is set such that a ratio of a long side is greater than 21:9.
(6) The display device according to any one of (1) to (5),
  wherein the display section is formed on a substantially entire surface of the front surface side of the main body.
(7) The display device according to any one of (1) to (4),
  wherein a shape of a surface where the operation section of the operation body spaced apart from the main body is formed is gradually widened along a short side direction of the main body, and
  wherein the operation section is formed on the widened side in the surface of the operation body.
(8) The display device according to (2), or according to any one of (3) to (7) that have cited (2),
  wherein the movable section bends the operation body.
(9) The display device according to (8),
  wherein the movable section bends the operation body such that the operation body is opened on an end portion side of a long side direction.
(10) The display device according to any one of (1) to (9),
  wherein the main body and the operation body are spaced apart at two places of both ends of the long side direction of the main body.
(11) An operation device including:
  an operation section; and
  an attachment section mounted on a rear surface side of a display device in which a display section is formed on a front surface side,
  wherein when mounted on the display device by the attachment section, the operation section is partially spaced apart from the display device, and the operation section is provided on an inner surface facing a space formed between the operation section and the display device.

What is claimed is:
1. A display device comprising:
  a main body in which a display section is formed on a front surface side; and an operation body in which an operation section is formed and which is provided on a rear surface side of the main body, wherein the main body and the operation body are partially spaced apart from each other, and the operation section is provided on an inner surface the operation body, the inner surface facing a space formed between the main body and the operation body, wherein a shape of a surface, where the operation section of the operation body is spaced apart from the main body, is gradually widened along a short side direction of the main body, and wherein an attachment section is provided in the operation body, and the attachment section is configured to detachably attach the operation body and the main body.

2. The display device according to claim 1, wherein a movable section is provided n the operation body, the movable section configured to move a part of the operation body in a direction substantially perpendicular to a display surface of the display section, and wherein the movable section is configured to move a part of the operation body to an open position by moving the part of the operation body in a direction away from the display section, and move the part of the operation body to an accommodation position by moving the part of the operation body in a direction towards the display section.

3. The display device according to claim 2, wherein the movable section is configured to bend the operation body.

4. The display device according to claim 3, wherein the movable section is configured to bend the operation body such t the operation body is opened on an end portion side of a long side direction.

5. The display device according to claim 1, wherein an aspect ratio of the display section is set to 21:9, or is set such that a ratio of a longer side to a shoter side of the display section is greater than 21:9.

6. The display device according to claim 1, wherein the display section is formed on substantially an entire surface of the front surface side of the main body.

7. The display device according to claim 1, wherein the operation section is formed on the widened side on the surface of the operation body.

8. The display device according to claim 1, wherein the main body and the operation body are spaced apart at two places at ends of a long side direction of the main body.

9. An operation device comprising:
an operation section; and
an attachment section mounted on a rear surface side of a display device in which a display section is formed on a front surface side,
wherein when mounted on the display device by the attachment section, the operation section is partially spaced apart from the display device, and the operation section is provided on an inner surface facing a space formed between the operation section and the display device,
wherein a shape of a surface, where the operation section is spaced apart from the display device, is gradually widened along a short side direction of the display device, and
wherein the attachment section is provided in an operation body, and the attachment section is configured to detachably attach the operation body and the display device.

10. The display device according to claim 1, wherein the attachment section is formed to be thicker than an operation portion, which is a portion of the operation body where the operation section is provided.

11. The display device according to claim 10, wherein the main body and the operation body are spaced apart from each other by a thickness difference between the attachment section and the operation portion.

12. A display device comprising:
a main body in which a display section is formed on a front surface side; and
an operation body in which an operation section is formed and which is provided on a rear surface side of the main body,
wherein the main body and the operation body are partially spaced part from each other, and the operation section is provided on an inner surface of the operation body, the inner surface facing a space formed between the main body and the operation body,
wherein a shape of a surface, where the operation section of the operation body spaced apart from the main body is formed, is gradually widened along a short side direction of the main body,
wherein the operation section is formed on the widened side in the surface of the operation body, and
wherein an attachment section is provided in the operation body, and the attachment section is configured to detachably attach the operation body and the main body.

13. A display device comprising:
a main body in which a display section is formed on a front surface side; and
an operation body in which an operation section is formed and which is provided on a rear surface side of the main body,
wherein the main body and the operation body are partially spaced apart from each other, and the operation section is provided on an inner surface of the operation body, the inner surface facing a space formed between the main body and the operation body,
wherein a shape of a surface, where the operation section of the operation body is spaced apart from the main body, is gradually widened along a short side direction of the main body,
wherein an attachment section configured to detachably attach the operation body and the main body is formed to be thicker than an operation a portion, which is a portion of the operation body where the operation section is provided, and
wherein the man body and the operation body are spaced apart from each other by a thickness difference between the attachment section and the operation portion.

* * * * *